United States Patent

[11] 3,589,735

[72] Inventor Katsumi Watanabe
No. 371, Ozenji, Kawaskaki-shi, Japan
[21] Appl. No. 784,704
[22] Filed Dec. 18, 1968
[45] Patented June 29, 1971
[32] Priority Mar. 1, 1968
[33] Japan
[31] 43/12865

[54] TOY PHONOGRAPH
4 Claims, 7 Drawing Figs.

[52] U.S. Cl. .......... 274/15, 274/1
[51] Int. Cl. .......... G11b 17/06
[50] Field of Search .......... 274/1.1, 15, 15.1, 15.2; 278/1

[56] References Cited
UNITED STATES PATENTS

| | | | |
|---|---|---|---|
| 2,380,037 | 7/1945 | Franck | 274/1 |
| 3,055,664 | 9/1962 | Curci | 274/15 |
| 3,208,755 | 9/1965 | Lieberman | 274/1 |

*Primary Examiner*—Leonard Forman
*Assistant Examiner*—A. J. Mirabito
*Attorney*—Steinberg & Blake

ABSTRACT: A toy phonograph having a rotatable turntable with a lifting cam in the center of the turntable onto which a pivoted lifting arm travels at the end of a play of record to lift up a hinged overchanging loudspeaker to free a pivoted tone arm to return to the periphery of the turntable and also having a pressing mechanism to press the loudspeaker against the tone arm while playing.

INVENTOR
KATSUMI WATANABE
BY Steinberg & Blake
ATTORNEYS

TOY PHONOGRAPH

The present invention relates to a toy phonograph.

The main objects of the present invention are to make it possible to perform long-time successive playing of the phonograph by automatically returning the pickup, which has arrived at the final position of a disc, to its starting position, to realize extremely positive and reliable operation of the mechanisms, and to simplify the entire setup of the apparatus.

The accompanying drawings illustrate an embodiment of the present invention, in which.

Figures 1, 2, 3, 4, 5, 6:
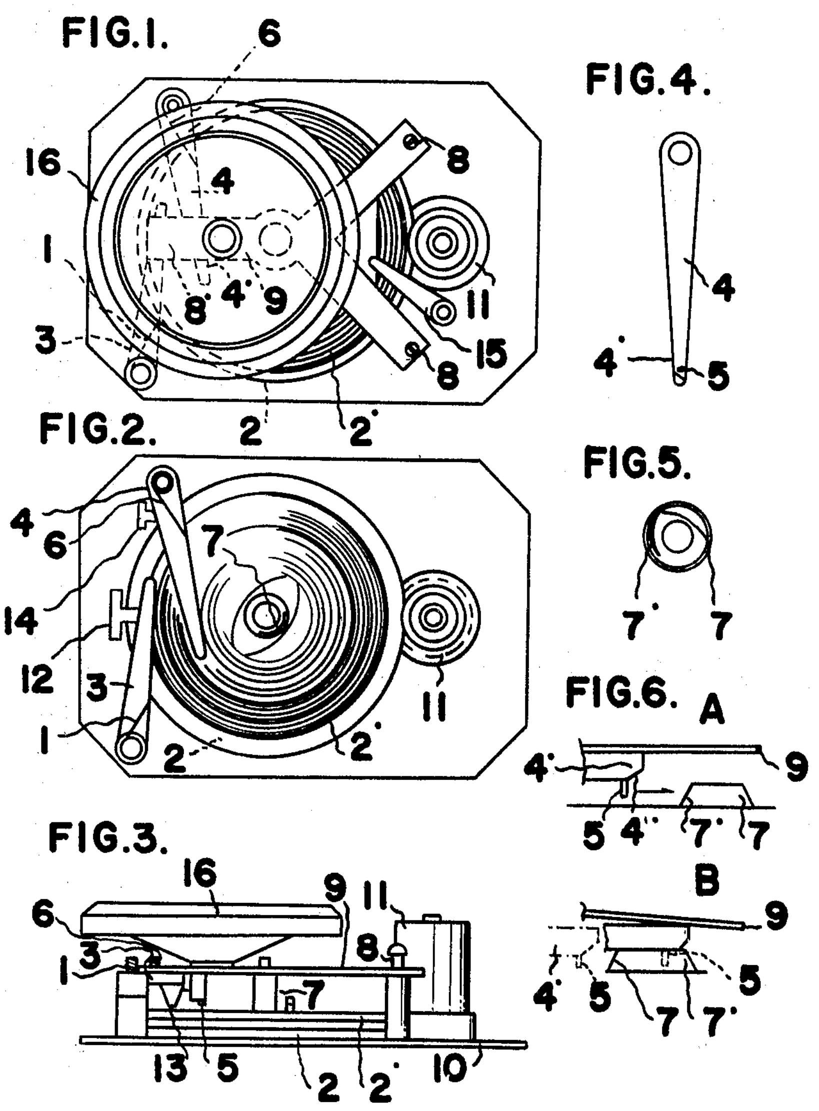
FIG. 1 is a plane view of the entire structure of the present device.
FIG. 2 is a same view but shown partly removed to give better view of the principal parts of the device.
FIG. 3 is a front view thereof.
FIG. 4 is a bottom view of a lift bar used in the toy phonograph according to the present invention.
FIG. 5 is a plane view of an involute lobe, and FIG. 6A and B are respectively an illustration showing an operating condition of said lift and said lobe.

The present invention is characterized by providing a pickup mechanism rotatably pivoted at one end and arranged to be constantly placed under force of a spring 1 which acts to urge it toward the periphery of a rotary disc 2, a lift bar mechanism which has its free end 4′ extended into the acting range of a pickup 3, has a bevel formed at its bottom, has a guide protuberance 5 provided near its free end, and is arranged to be always placed under force of a spring 6 which urges it toward the periphery of said rotary disc 2, a hoisting mechanism which rotates together with said rotary disc 2 and is provided with a substantially trapezoid-shaped lobe 7 extended upward involutely with respect to the driving center thereof, with said lift bar 4 being hooked at its predetermined position around said lobe to be thereby hoisted, and a pressing mechanism having its base ends 8 hingedly pivoted and its fore end 8′ placed on the free end of the pickup 3 so as to suitably press it, all of said mechanisms being arranged in their respective positions on a base 10 so that they are automatically actuated in succession.

Now, a practical aspect of the present invention will be discussed in detail while referring to the accompanying drawings. 1 is a steel wire spring of which the free end is checked against a side of a pickup 3 to force said pickup 3 to be always directed toward the periphery of a rotary disc 2 on which a record disc 2′ is placed, said pickup 3 being rotatably pivoted at one end and also having a needle 13 secured at its tip end. 4 is a lift bar extended within the swaying range of said pickup, with one end thereof being rotatably pivoted, while the free end 4′ thereof has formed at its bottom side a bevel 4″ and a guide protuberance 5 as shown in FIG. 6. 7 is a projection or lobe extended involutely or eccentrically with respect to said rotary disc, said lobe being substantially trapezoid shaped and arranged to rotate with said disc 2. 10 is a base plate on which each of said means is securely seated in respective position, 11 an electric motor disposed in juxtaposition with said rotary disc for rotating said disc at constant speed through a belt or rubber rollers, 12 a stopper which stops at a predetermined position the pickup 3 tending to move out toward the circumference of said rotary disc 2 so that the needle 13 provided at the bottom end of the pickup 3 will take a position corresponding to the starting position of the record disc 2′, and 14 another stopper which holds at a predetermined position the lift bar 4 also tending to move out toward the periphery of the rotary disc. 9 is a pressing plate having its ends 8 hingedly pivoted loosely so that said plate is freely swayable, with the fore end thereof being placed on the pickup 3 to suitably press it so that the needle 13 is pressedly fitted in the sound channel of the record disc 2′.

Also in the drawings, 15 is a leaf spring which gives required downward pressing force to said pressing plate 9, and 16 a loudspeaker mounted on said plate 9.

In operation of the present device, first the fore end of the pressing plate 9 hingedly pivoted at its ends 8 is lifted up, whereby the pickup 3 is released of pressure given thereto from above and is allowed to move toward the periphery of the rotary disc 2 by pressing force of the spring 1. But the scope of its movement is limited by the stopper 12 so that the needle 13 provided on the bottom side of the free end of the pickup 3 is just placed on the starting position of the disc 2′. Coincidentally with this, the lift bar 4 is also swung out in the same manner, and the scope of its swing is limited by the stopper 14 so as to take a predetermined position in the acting range of the pickup 3 as shown in FIG. 2.

Then, the pressing plate 9 is rested on the pickup, followed by closing of a switch (not shown) to actuate the electric motor 11 to cause rotation of the rotary disc 2 and also the record disc 2′, whereby the needle 13 fitted in the disc channel comes to trace said channel and the recorded sound or voice is reproduced and given out amplified through the loudspeaker 16.

If rotation is further continued, the needle 13 moves, together with the pickup 3, along the helical channel toward the center of the disc, while pushing in the same direction the lift bar 4 disposed halfway on the path of the needle, until said needle reaches the terminal of the channel, thus completing one performance.

In this case, the free end 4′ of the lift bar 4 located inwardly of the pickup 3 is opposed to the lobe 7 which is rotating with the rotary disc 2, and the bevelled portion 4″ of the free end 4′ moves upward along the slope 7′ of the lobe 7, causing the pressing plate 9 thereon to accordingly move up, as shown in FIG. 6A and B. At the same time, the guide protuberance 5 slides along the inner face of the lobe 7 and provides a detent against further expansion of the lift bar 4. When the pressing plate 9 is thus raised, the pickup 3 constantly urged toward the periphery is now released of its oppressing force and immediately begins its movement to return to its position defined by the stopper 12, that is, the starting position. The spring 1 acts on the pickup 3 not only to urge it toward the stop 12 but also to raise the pickup 3 sufficiently so that the needle 13 will clear the record disc 2′ during the return of the pickup 3. Such constructions are well known. Thus, the pickup 3 is mounted on its pivot not only for swinging movement about a vertical axis but also with sufficient play to move vertically at its free end toward and away from the disc record 2′. The spring 1 acts not only to return the pickup 3 to its starting position, but also to raise the needle 13 from the record 2′. Such constructions are well known in the art. For example, U.S. Pat. No. 3,208,755 shows in FIG. 6 a spring acting on a pickup arm not only to return it to its starting position but also to raise the stylus from the record. Therefore, this feature, known per se, does not form part of the present invention.

If rotation further proceeds, the lobe 7 comes off the lift bar 4 which, thereupon, moves down, allowing the pressing plate 9 to also descend, while said bar itself is expanded outwardly by the spring 6 to return to its position defined by the stopper 14.

Under this condition, the pickup 3, lift bar 4 and pressing plate 9 are all stationed in their respective starting positions, so that if the motor 11 is kept going, the same cycle of operation is repeated, allowing long-time continuous playing of the phonograph. Thus the apparatus is automatically operated without requiring any trouble in keeping it going, and the set objects of the present invention are perfectly accomplished.

I claim for patent:

1. A toy phonograph comprising a base, a rotatable turntable on said base, a pickup arm pivoted at one end, a first spring, said arm being constantly placed under a force of said first spring which urges said pickup toward the periphery of the turntable, a lift bar with a free end and a pivoted end in releasable engagement with the pickup and which lift bar has a bevel formed at the bottom of the free end and a guide protuberance provided near its free end, a second spring, said lift bar being constantly placed under force of said second spring which urges it towards the periphery of the turntable, a hoisting mechanism which rotates together with said turntable and has a substantially trapezoidal-shaped lobe extended upwardly with respect to the center of the turntable, with the free end of said lift bar mechanism being hooked at a predetermined position around said lobe to be thereby hoisted by the lobe, and a pressing mechanism with ends on said base, a speaker in said pressing mechanism and a free end, having its base ends hingedly pivoted and its free end placed on the free end of the pickup so as to suitably press it down.

2. In a device according to claim 1, a lift bar which is characterized in that it is pivoted at one end, that a spring constantly forces said bar toward the periphery of the rotary disc, that a slope is formed on the bottom side of free end of said bar, said slope corresponding oppositely to a bevel of said lobe, and a projected guide portion at its free end.

3. In a device according to the claim 1, a lobe extended involutely or eccentrically with respect to the center of the turntable, with both sides thereof being sloped.

4. In a device according to the claim 1, a stop to locate said lift bar in a starting position at the periphery of the turntable.